US012318890B2

(12) United States Patent
Kawai

(10) Patent No.: US 12,318,890 B2
(45) Date of Patent: Jun. 3, 2025

(54) IMPACT TOOL

(71) Applicant: MAKITA CORPORATION, Anjo (JP)

(72) Inventor: Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/510,761

(22) Filed: Nov. 16, 2023

(65) Prior Publication Data

US 2024/0082994 A1 Mar. 14, 2024

Related U.S. Application Data

(63) Continuation of application No. 17/548,703, filed on Dec. 13, 2021, now Pat. No. 11,858,094.

(30) Foreign Application Priority Data

Jan. 6, 2021 (JP) ................................ 2021-001036

(51) Int. Cl.
*B25B 21/02* (2006.01)

(52) U.S. Cl.
CPC .................................. *B25B 21/02* (2013.01)

(58) Field of Classification Search
CPC ....... B25B 21/02; B25B 21/00; B25B 21/026; B25B 23/16; B25B 23/147; B25B 23/1475; B25B 23/1453; B25B 23/1405; B25B 19/00; B25D 11/04; B25D 11/066; B25D 16/00; B25D 16/003; B25D 16/006; B25D 2216/0023; B25F 5/026; B25F 5/001
USPC .......... 173/117, 90, 91, 93, 94, 128; 81/464
See application file for complete search history.

(56) References Cited

U.S. PATENT DOCUMENTS 3,952,814 A * 4/1976 Gelfand .................. B25B 21/02 173/93
4,784,325 A * 11/1988 Walker .................... B05B 15/74 239/230
5,199,505 A 4/1993 Izumisawa
5,269,733 A * 12/1993 Anthony, III ......... B25B 21/026 173/171
6,138,772 A * 10/2000 Miescher ............... B25D 16/00 173/205
2003/0173178 A1* 9/2003 Sasaki .................. F16D 41/206 192/3.51
2006/0090913 A1* 5/2006 Furuta .................. B25D 16/003 173/48
2010/0078186 A1 4/2010 Takeyama et al.
(Continued)

FOREIGN PATENT DOCUMENTS

JP 2015-128820 A 7/2015
JP 2019-000936 A 1/2019

OTHER PUBLICATIONS

May 28, 2024 Office Action issued in Japanese Patent Application No. 2021-001036.

*Primary Examiner* — Dariush Seif
(74) *Attorney, Agent, or Firm* — Oliff PLC

(57) ABSTRACT

Durability deterioration caused by a shock load is effectively reduced. An impact driver includes a motor, a carrier including a reduction assembly and rotatable by the motor, a shaft that receives rotation of the carrier and is rotatable relative to the carrier in an overloaded state, a hammer held by the shaft, and an anvil that is struck by the hammer in a rotation direction.

15 Claims, 10 Drawing Sheets

(56) References Cited

U.S. PATENT DOCUMENTS

2010/0326686 A1* 12/2010 Leong .................. B25B 21/026 173/48
2012/0000683 A1* 1/2012 Nagasaka ............. B25B 21/026 173/93.5
2012/0000684 A1* 1/2012 Sugimoto ............... B25B 21/02 173/205
2012/0073845 A1 3/2012 Nakamura
2012/0111592 A1 5/2012 Limberg et al.
2012/0132452 A1* 5/2012 Hoop .................... B25B 21/026 173/93.5
2012/0222876 A1* 9/2012 Schmidt .................. B25B 31/00 173/179
2012/0318548 A1* 12/2012 Hirabayashi ............ B25B 21/00 173/93.6
2013/0032370 A1* 2/2013 Hirabayashi ......... B25D 11/106 173/47
2013/0087355 A1* 4/2013 Oomori ................... B25B 21/02 173/94
2013/0133911 A1* 5/2013 Ishikawa ............... B25B 21/026 173/176
2013/0333910 A1* 12/2013 Tanimoto ................ B25B 21/02 173/176
2014/0158388 A1 6/2014 Johnson
2014/0346744 A1* 11/2014 Herr ....................... B25D 17/00 279/144
2014/0374130 A1* 12/2014 Nakamura ............ B25B 21/026 173/176
2015/0034346 A1* 2/2015 Tao ....................... B25B 13/065 173/109
2015/0041169 A1* 2/2015 Kumagai ............... B25D 17/26 173/93.7
2015/0151415 A1* 6/2015 Saitou ....................... B25F 5/02 173/93
2015/0231770 A1* 8/2015 Kusakawa .......... B25B 23/1475 173/93.5
2016/0008961 A1* 1/2016 Takano ............... B25B 23/1475 173/2
2016/0121470 A1* 5/2016 Mayer ................. B25B 23/1475 173/2
2016/0176027 A1 6/2016 Aoyagi
2016/0318163 A1* 11/2016 Komuro ................ B25B 23/147
2017/0070168 A1* 3/2017 Takano ..................... B25F 5/00
2017/0144278 A1 5/2017 Nishikawa et al.
2017/0259412 A1 9/2017 Nishikawa et al.
2017/0326720 A1* 11/2017 Kuroyanagi ............ B25F 5/021
2018/0001444 A1* 1/2018 Matsushita ............. B25B 23/18
2018/0117745 A1* 5/2018 Murakami ............. B25D 11/04
2018/0272510 A1* 9/2018 Muramatsu ........... B25B 21/026
2018/0297179 A1* 10/2018 Osada ................... B25B 21/008
2019/0047131 A1* 2/2019 Ichikawa ................ B25B 21/02
2019/0118353 A1* 4/2019 Woetzl ................ B25B 23/1475
2019/0184528 A1* 6/2019 Herr ........................ B25B 21/02
2019/0262978 A1* 8/2019 Tejima .................. B25B 21/026
2020/0215678 A1* 7/2020 Nakashima ............. B25F 5/006
2020/0217412 A1 7/2020 Nakashima
2020/0269407 A1* 8/2020 Kawai .................... B25D 16/00
2021/0053201 A1* 2/2021 Mandal ................... B25B 21/02
2021/0060755 A1* 3/2021 Kawai ....................... B25F 5/00
2021/0078146 A1* 3/2021 Araki ...................... B25F 5/001
2021/0086333 A1* 3/2021 Murakami .......... B25B 23/1475
2021/0162571 A1* 6/2021 Kondo .................. B25B 21/026
2021/0187707 A1 6/2021 Smith et al.
2021/0187717 A1 6/2021 McClung et al.
2021/0362308 A1 11/2021 Li et al.
2022/0212320 A1 7/2022 Kawai
2022/0395911 A1* 12/2022 Tamura ................... B23B 45/02

* cited by examiner

IMPACT TOOL

CROSS-REFERENCE TO RELATED APPLICATIONS

This is a Continuation of U.S. patent application Ser. No. 17/548,703, filed Dec. 13, 2021, which claims the benefit of Japanese Patent Application No. 2021-001036, filed Jan. 6, 2021, the entire contents of which are hereby incorporated by reference.

BACKGROUND

1. Technical Field

The present invention relates to an impact tool such as an impact driver.

2. Description of the Background

For example, an impact driver described in Japanese Unexamined Patent Application Publication No. 2019-936 includes a motor in its rear and an output unit in its front including an anvil drivable by the motor for rotational striking. The output unit further includes a spindle rotatable as the motor rotates and a hammer connected to the spindle with a cam with balls in between. The hammer is urged to a forward position by a coil spring externally mounted on the spindle to have its tabs on the front surface engaged with arms of the anvil in the rotation direction.

When the motor is driven to rotate the spindle, the anvil rotates with the hammer, allowing a screw to be screwed with a bit attached to the anvil. As the screw is tightened and increases the torque of the anvil, the hammer retracts against the urging force from the coil spring while rolling the balls along cam grooves in the spindle. After the tabs are disengaged from the arms, the hammer rotates forward along the cam grooves under the urging force from the coil spring. This then causes the tabs to be re-engaged with the arms, causing the anvil to generate a rotational impact force (impact). This process is repeated for further tightening of the screw.

BRIEF SUMMARY

For tightening a screw in a high load state with this impact tool, the hammer may retract under the reaction force from the impact to a rearmost position until the balls reach the rear ends of the cam grooves. The hammer retracting to the rearmost position is urged further to rotate with the rotational energy, thus causing an overloaded state in which a shock load applied to the spindle through the balls reaches internal components in the preceding stage including planetary gears. This may lower the durability of the impact tool.

One or more aspects of the present disclosure are directed to an impact tool that effectively reduces durability deterioration caused by a shock load.

A first aspect of the present disclosure provides an impact tool, including:

a motor;

a carrier including a reduction assembly and rotatable by the motor;

a shaft configured to receive rotation of the carrier, the shaft being rotatable relative to the carrier in an overloaded state;

a hammer held by the shaft; and an anvil configured to be struck by the hammer in a rotation direction.

The impact tool according to the above aspect of the present disclosure effectively reduces durability deterioration caused by a shock load.

DETAILED DESCRIPTION

Embodiments of the present disclosure will now be described with reference to the drawings.

Figure 1:
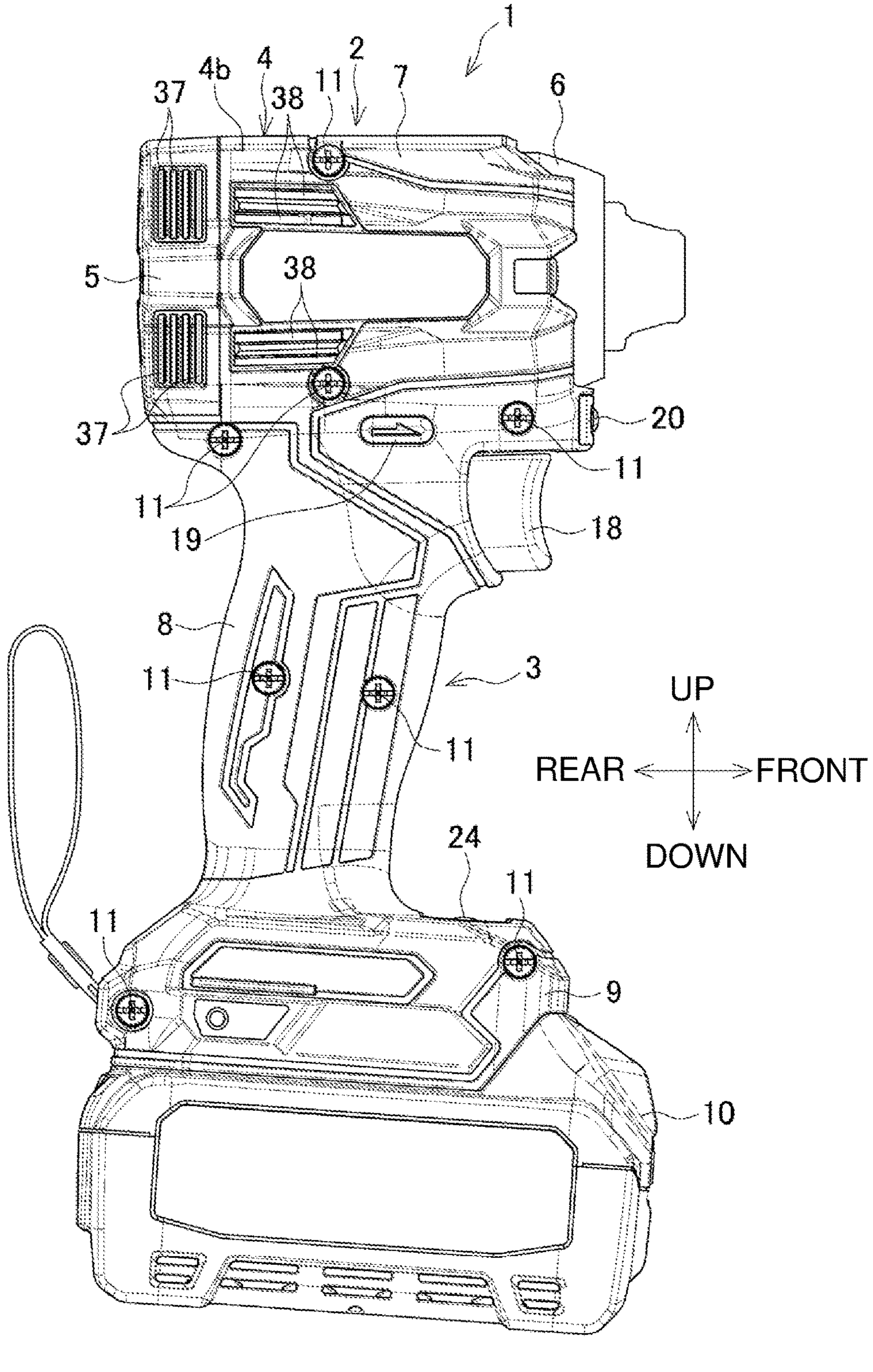
FIG. 1 is a side view of an impact driver.
Figure 2:
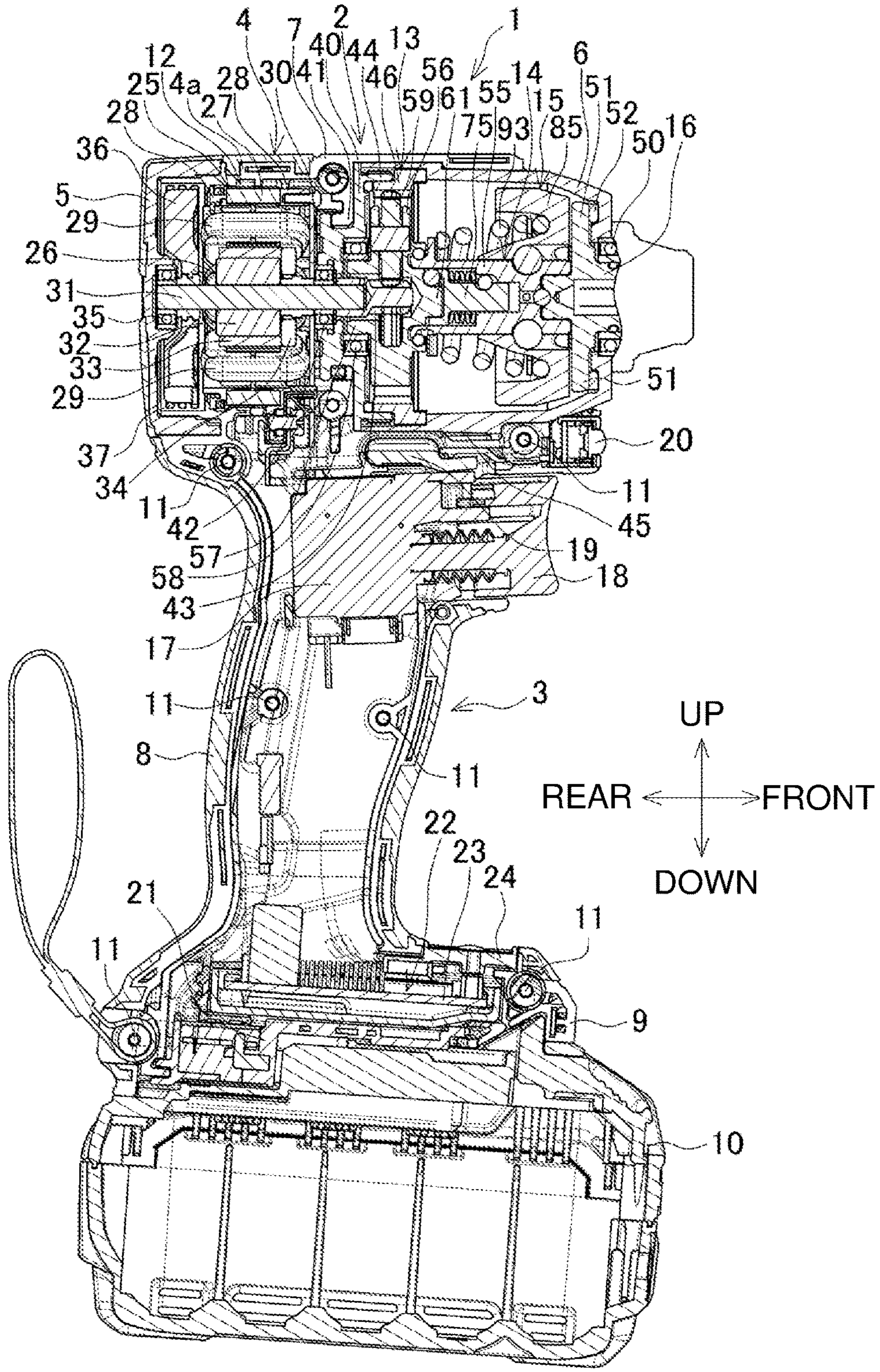
FIG. 2 is a longitudinal central sectional view of the impact driver.

FIG. 1 is a side view of a rechargeable impact driver as an example of an impact tool. FIG. 2 is a longitudinal central sectional view of the impact driver.

An impact driver 1 includes a body 2 and a grip 3. The body 2 includes a central axis extending in the front-rear direction. The grip 3 protrudes downward from the body 2. The impact driver 1 includes a housing including a body housing 4, a rear cover 5, and a hammer case 6. The body housing 4 includes a motor housing 7, a grip housing 8, and a battery mount 9. The motor housing 7 is cylindrical and defines a rear portion of the body 2. The grip housing 8 defines the grip 3. The battery mount 9 receives a battery pack 10, which serves as a power supply.

The body housing 4 and the rear cover 5 are formed from resin. The body housing 4 includes left- and right-half housings 4*a* and 4*b*. The left- and right-half housings 4*a* and 4*b* are joined together with multiple screws 11 placed from the right. The rear cover 5 is a cap. The rear cover 5 is joined to the motor housing 7 from the rear with two screws, or right and left screws.

The hammer case 6 is formed from metal. The hammer case 6 is joined to a front portion of the motor housing 7. The hammer case 6 defines a front portion of the body 2. Lamps (not shown) for illuminating ahead are located on the right and left of the hammer case 6 between the hammer case 6 and the motor housing 7.

The body 2 accommodates, from the rear, a brushless motor 12, a reduction assembly 13, a spindle 14, and a striking assembly 15. The brushless motor 12 is accommodated in the motor housing 7 and the rear cover 5. The reduction assembly 13, the spindle 14, and the striking assembly 15 are accommodated in the hammer case 6. The striking assembly 15 includes an anvil 16. The anvil 16 has a front end protruding frontward from the hammer case 6.

The grip 3 accommodates a switch 17 in its upper portion. A trigger 18 protrudes in front of the switch 17.

A forward-reverse switch lever 19 for the brushless motor 12 is located between the hammer case 6 and the switch 17. A mode switch 20 is located in front of the forward-reverse switch lever 19. The mode switch 20 faces frontward and has a button exposed on the front surface. The button is repeatedly pressed to switch impact forces or registered striking modes.

The battery mount 9 accommodates a terminal base 21 and a controller 22. The terminal base 21 is electrically connected to multiple battery cells encased in the battery pack 10. The controller 22 is located above the terminal base 21. The controller 22 includes a control circuit board 23 receiving, for example, a microcomputer and switching elements. A display panel 24 is located on the upper surface of the battery mount 9. The display panel 24 is electrically connected to the control circuit board 23. The display panel 24 displays the rotational speed of the brushless motor 12 and the remaining battery level of the battery pack 10. The display panel 24 also allows other operations including switching the on-off state of the lamps.

The brushless motor 12 is an inner-rotor motor including a stator 25 and a rotor 26. The stator 25 includes a stator core 27, insulators 28, and coils 29. The insulators 28 are on the front and the rear of the stator core 27. The coils 29 are wound around the stator core 27 with the insulators 28 in between.

The front insulator 28 receives a sensor circuit board 30. The sensor circuit board 30 includes three rotation detectors (not shown). The three rotation detectors detect the position of a sensor permanent magnet 34 in the rotor 26 and output rotation detection signals.

The rotor 26 includes a rotational shaft 31, a cylindrical rotor core 32, a permanent magnet 33, and the sensor permanent magnet 34. The rotational shaft 31 is aligned with the axis of the rotor 26 and extends in the front-rear direction. The permanent magnet 33 is cylindrical and surrounds the rotor core 32. The sensor permanent magnet 34 is in front of the rotor core 32.

The rear cover 5 holds a bearing 35 in the center portion of its rear inner surface. The bearing 35 axially supports the rear end of the rotational shaft 31. The rotational shaft 31 receives a fan 36 for cooling the motor in front of the bearing 35. The rear cover 5 has multiple outlets 37 in its circumferential surface outward from the fan 36. The motor housing 7 has multiple inlets 38 in its right and left side surfaces in front of the outlets 37.

A bearing box 40 is held in front of the brushless motor 12 in the motor housing 7. The bearing box 40 is a disk having a stepped shape with a center portion protruding rearward. The motor housing 7 includes an engagement rib 41 on its inner surface. The engagement rib 41 is engaged with the bearing box 40.

The bearing box 40 receives the rotational shaft 31 through its center. The bearing box 40 holds a bearing 42 in its rear portion. The bearing 42 supports the rotational shaft 31. The rotational shaft 31 receives a pinion 43 at its front end.

Figure 3:
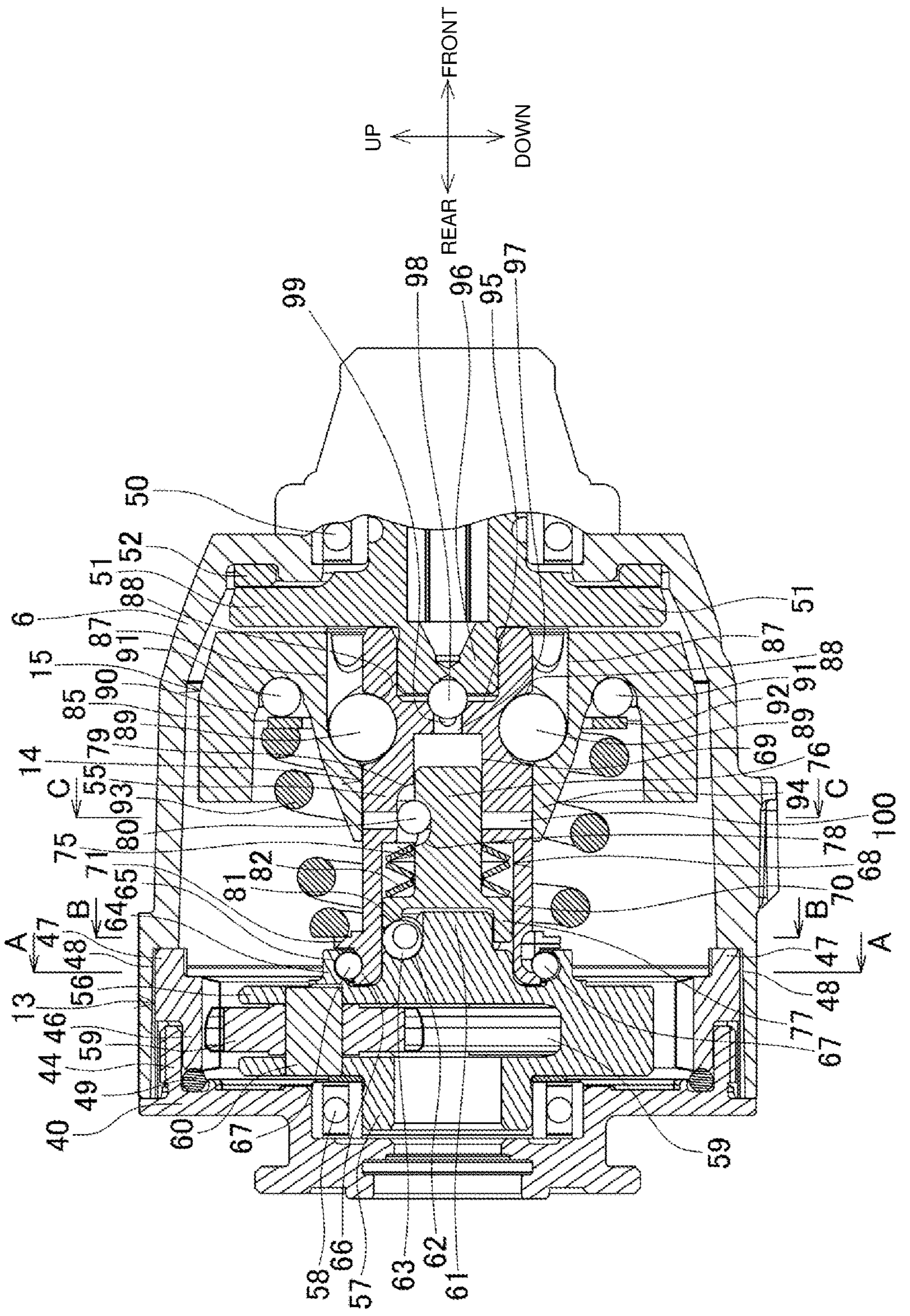
FIG. 3 is an enlarged view of a hammer case in FIG. 2.

As shown in FIG. 3, the bearing box 40 includes an inner wall 44 on its outer circumference. The inner wall 44 is annular and extends frontward. The inner wall 44 has a thread on its outer circumferential surface. The hammer case 6 has an internal thread on its inner circumference at the rear. The inner wall 44 is screwed to the hammer case 6. The hammer case 6 includes a projection 45 on its lower surface. The projection 45 is held between the left- and right-half housings 4*a* and 4*b*. The hammer case 6 is thus locked in a nonrotatable manner in the motor housing 7. The hammer case 6 is also positioned in the front-rear direction with the engagement rib 41.

Figure 4:
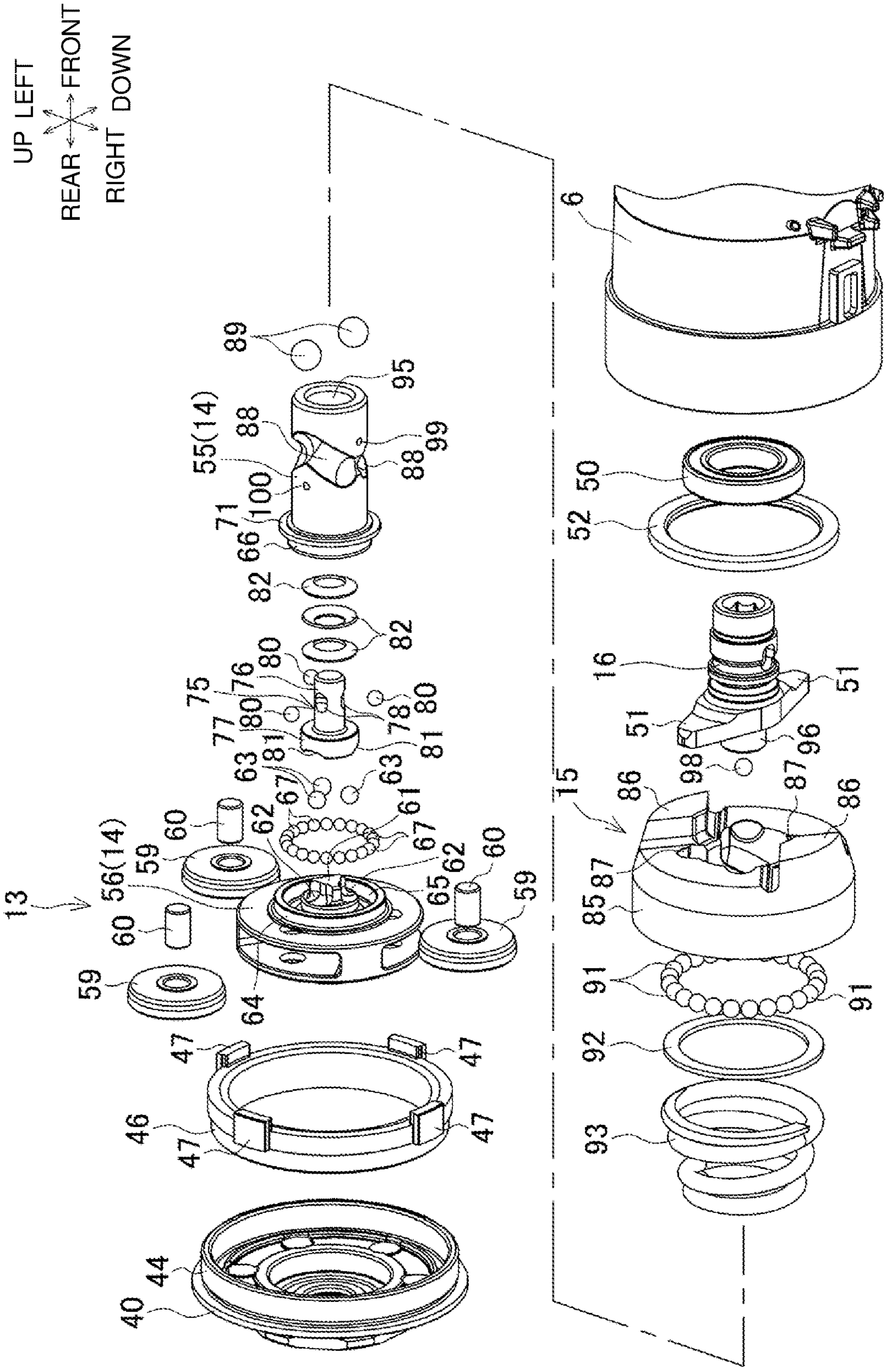
FIG. 4 is an exploded perspective view of the hammer case.
Figure 5:
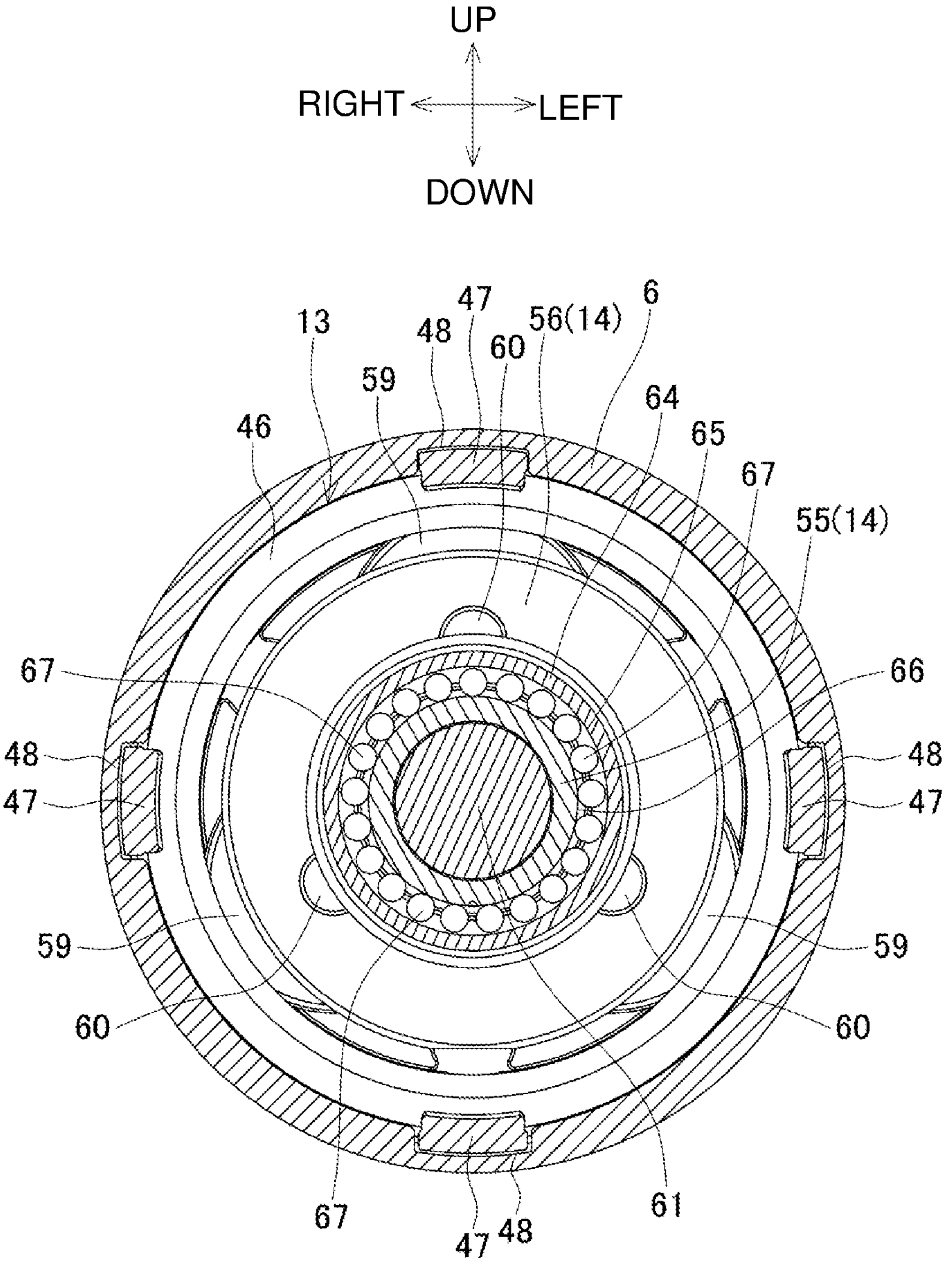
FIG. 5 is an enlarged cross-sectional view taken along line A-A in FIG. 3.

An internal gear 46 is held inside the inner wall 44. The internal gear 46 forms the reduction assembly 13. As shown in FIG. 4, the internal gear 46 includes, on its outer circumferential surface, multiple protrusions 47 protruding frontward. The protrusions 47 are held between the inner wall 44 and the hammer case 6. The hammer case 6 includes multiple recesses 48 on its inner circumferential surface. The recesses 48 are fitted with the respective protrusions 47. As shown in FIG. 5, the internal gear 46 is restricted from rotating by the protrusions 47 and the recesses 48 engaged with each other. An O-ring 49 is located inside the inner wall 44. The O-ring 49 receives the rear end of the internal gear 46.

The hammer case 6 is cylindrical and tapered frontward. A bearing 50 is at the front end of the hammer case 6. The bearing 50 supports the anvil 16. The anvil 16 includes a pair of arms 51 behind the bearing 50. A receiving ring 52 is on the inner wall of the hammer case 6 in front of the arms 51. The receiving ring 52 receives the arms 51.

The spindle 14 is dividable into a shaft 55 at the front and a carrier 56 at the rear. The carrier 56 is hollow and disk-shaped. The carrier 56 includes, at its center, a cylindrical portion 57 that opens rearward. The cylindrical portion 57 is held in the bearing box 40 with the bearing 58. The pinion 43 on the rotational shaft 31 protrudes into the cylindrical portion 57. The carrier 56 includes three planetary gears 59. The planetary gears 59 mesh with internal teeth on the internal gear 46. The planetary gears 59 are rotatably supported by pins 60. The planetary gears 59 mesh with the pinion 43, forming the reduction assembly 13.

Figure 6:
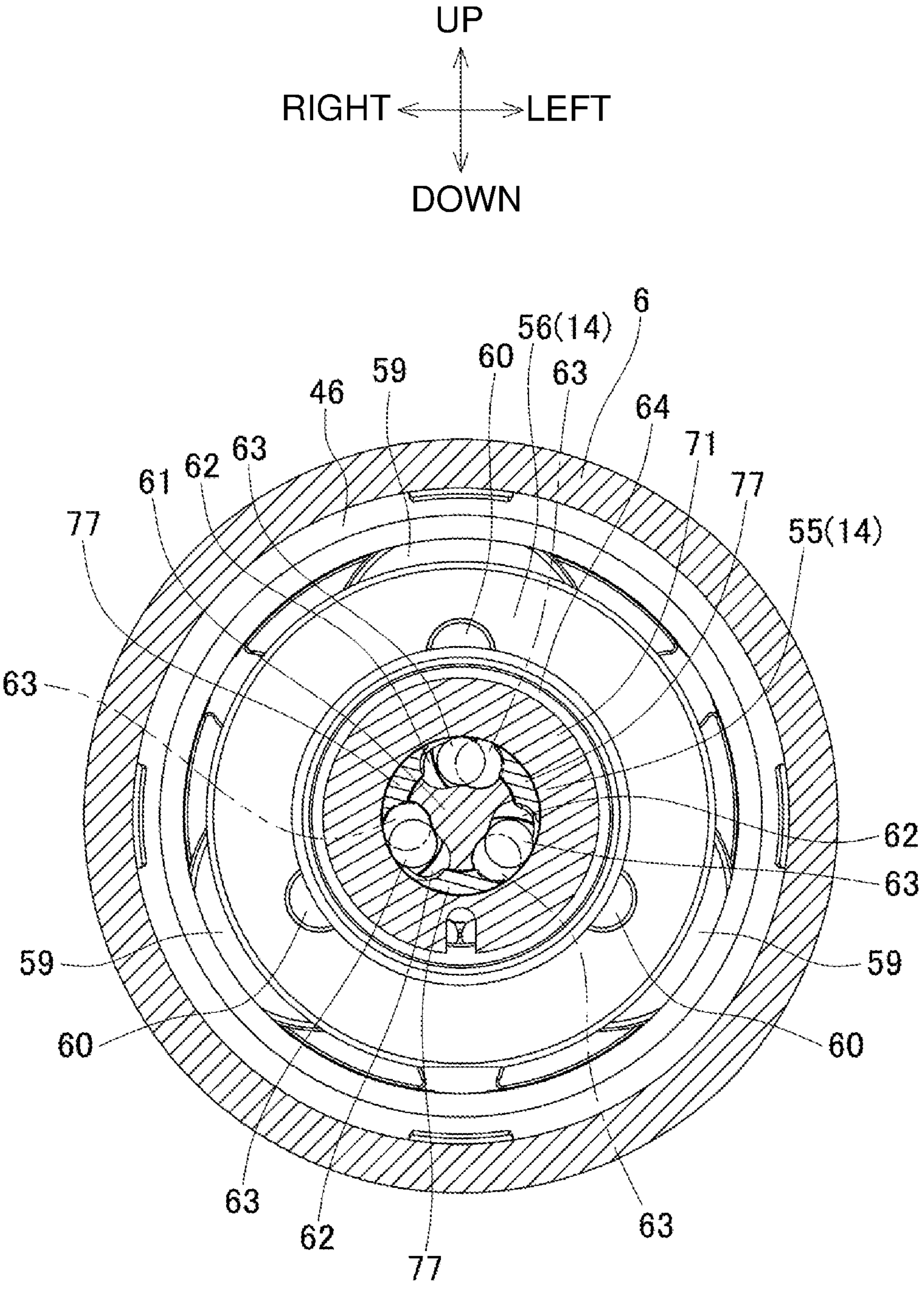
FIG. 6 is an enlarged cross-sectional view taken along line B-B in FIG. 3.

The carrier 56 has, at the center of its front surface, a cam projection 61 protruding frontward. The cam projection 61 protrudes into a rear portion of the shaft 55. As shown in FIG. 6, the cam projection 61 has three rear cam recesses 62 on its circumferential surface. The rear cam recesses 62 are cutouts on the front end of the cam projection 61 toward the rear. The rear cam recesses 62 each have an inner surface extending in the circumferential direction of the cam projection 61 and a bottom. The three rear cam recesses 62 are arranged at equal intervals in the circumferential direction of the cam projection 61. The three rear cam recesses 62 receive three cam balls 63. The cam balls 63 are restricted from moving outward in the radial direction of the cam projection 61 by expanded portions 77 of a cam 75 (described later), and are thus rollable circumferentially in the rear cam recesses 62.

The carrier 56 has a joint 64 around the cam projection 61 on its front surface. The joint 64 is annular and protrudes frontward concentrically with the cam projection 61. The joint 64 has an outer recess 65 along its entire inner circumferential surface.

The shaft 55 is a cylinder having an outer diameter smaller than the inner diameter of the joint 64. The shaft 55 has its rear end between the cam projection 61 and the joint 64. The shaft 55 has an inner recess 66 along its entire outer circumferential surface at the rear end. The inner recess 66 faces the outer recess 65 on the joint 64. As shown in FIG. 5, multiple connecting balls 67 are fitted in the outer recess 65 and in the inner recess 66. The shaft 55 is thus prevented from slipping off the carrier 56, and is also coaxially connected to the carrier 56 in a rotatable manner.

The shaft 55 has a cam reception hole 68 that opens rearward. The cam reception hole 68 has a stepped-diameter including a front small diameter hole 69 and a rear large diameter hole 70. The shaft 55 includes a flange 71 having a larger diameter than the joint 64 in front of the inner recess 66.

The cam reception hole 68 receives the cam 75. The cam 75 includes a front shaft 76 and the expanded portions 77. The front shaft 76 is placed into the small diameter hole 69. The cam 75 includes three expanded portions 77 arranged circumferentially. The expanded portions 77 are placed into the large diameter hole 70.

Figure 7:
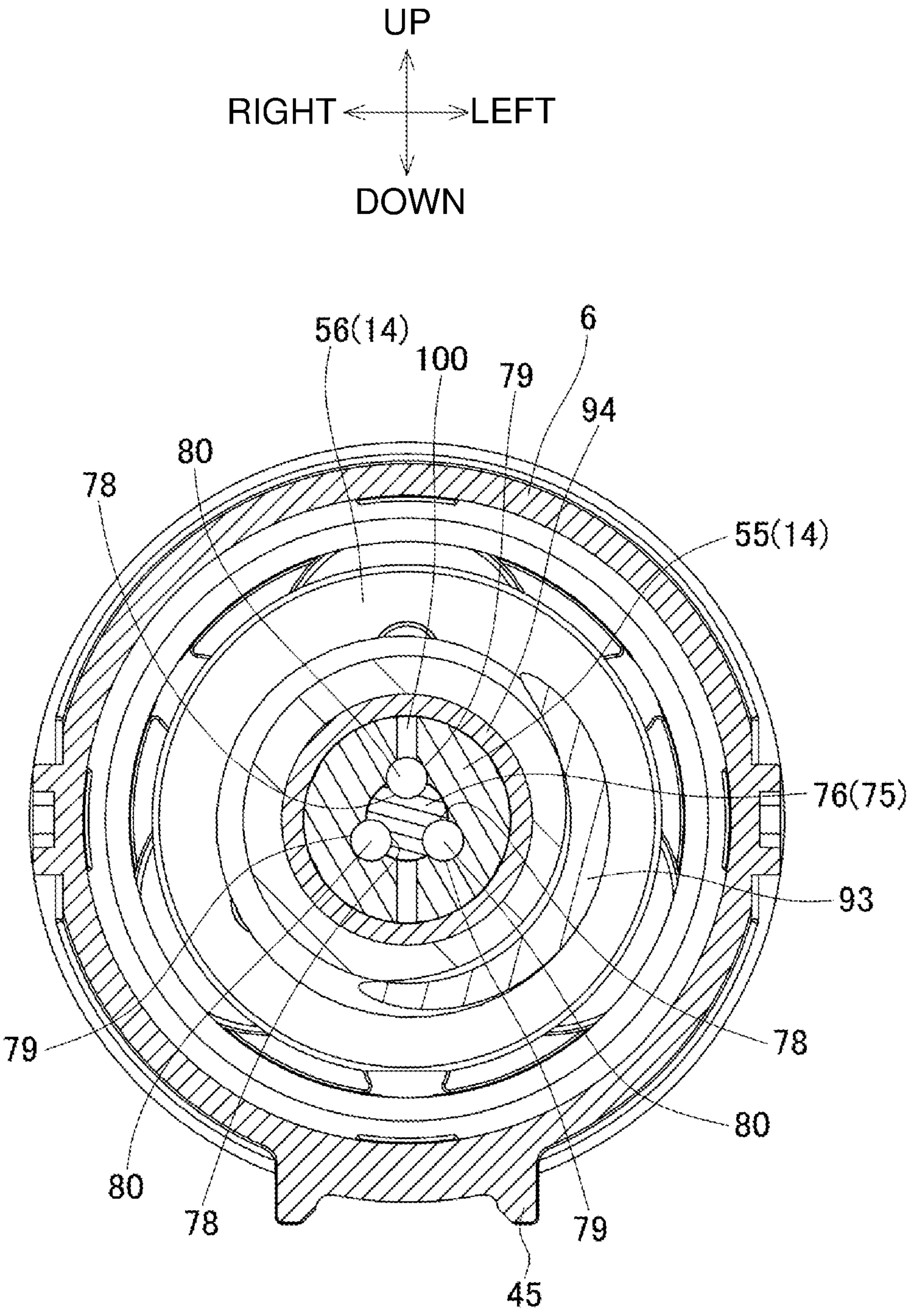
FIG. 7 is an enlarged cross-sectional view taken along line C-C in FIG. 3.

As shown in FIG. 7, the front shaft 76 has three inner grooves 78 on its outer circumferential surface. The inner grooves 78 extend in the front-rear direction. The three inner grooves 78 are arranged at equal intervals in the circumferential direction of the front shaft 76. The small diameter hole 69 facing the inner grooves 78 has three outer grooves 79 on its inner circumferential surface. The outer grooves 79 extend frontward from the rear end of the small diameter hole 69. Three coupling balls 80 are fitted in the inner grooves 78 and in the outer grooves 79. The coupling balls 80 cause the cam 75 to be integrally coupled to the shaft 55 in the rotation direction. The cam 75 is movable relative to the shaft 55 in the front-rear direction within the range in which the coupling balls 80 roll back and forth in the inner grooves 78 and in the outer grooves 79.

The expanded portions 77 have three front cam recesses 81 on the rear ends. The front cam recesses 81 each have an arc shape recessing frontward. The front cam recesses 81 are fitted with the cam balls 63 placed in the rear cam recesses 62 from the front.

Multiple disc springs 82 are externally mounted on the front shaft 76. The disc springs 82 are arranged between the step at the front end of the large diameter hole 70 and the front surfaces of the expanded portions 77, urging the cam 75 rearward. The front cam recesses 81 are engaged with the cam balls 63 under the urging force from the disc springs 82. The rotation of the cam projection 61 is thus transmitted to the cam 75.

A hammer 85 is externally mounted on the shaft 55. The hammer 85 includes a pair of tabs 86 on its front surface. The hammer 85 has a pair of outer cam grooves 87 on its inner circumferential surface. The outer cam grooves 87 extend rearward from the front end of the hammer 85. The pair of outer cam grooves 87 are point-symmetric to each other about the axis of the hammer 85. The shaft 55 has a pair of inner cam grooves 88 on its outer circumferential surface. The pair of inner cam grooves 88 are point-symmetric to each other about the axis of the shaft 55. The pair of inner cam grooves 88 are each inverted V-shaped with the tip being the front. Two balls 89 are fitted in the outer cam grooves 87 and in the inner cam grooves 88. With the balls 89 in between, the hammer 85 and the shaft 55 are coupled together in the rotation direction.

The hammer 85 has an annular groove 90 on its rear surface. The groove 90 receives multiple spring balls 91 on its bottom. A washer 92 is behind the spring balls 91.

A coil spring 93 is externally mounted on the shaft 55. The coil spring 93 is tapered to have a diameter gradually decreasing toward the rear. The rear end of the coil spring 93 is in contact with the flange 71 on the shaft 55. The front end of the coil spring 93 is in contact with the washer 92 in the groove 90. The hammer 85 includes a central cylindrical portion 94 that defines the inner circumferential surface of the groove 90. Similarly to the coil spring 93, the central cylindrical portion 94 is tapered to have a diameter gradually decreasing toward the rear. The central cylindrical portion 94 protrudes more rearward than the outer diameter portion of the hammer 85 that defines the outer circumferential surface of the groove 90.

Figure 8A:
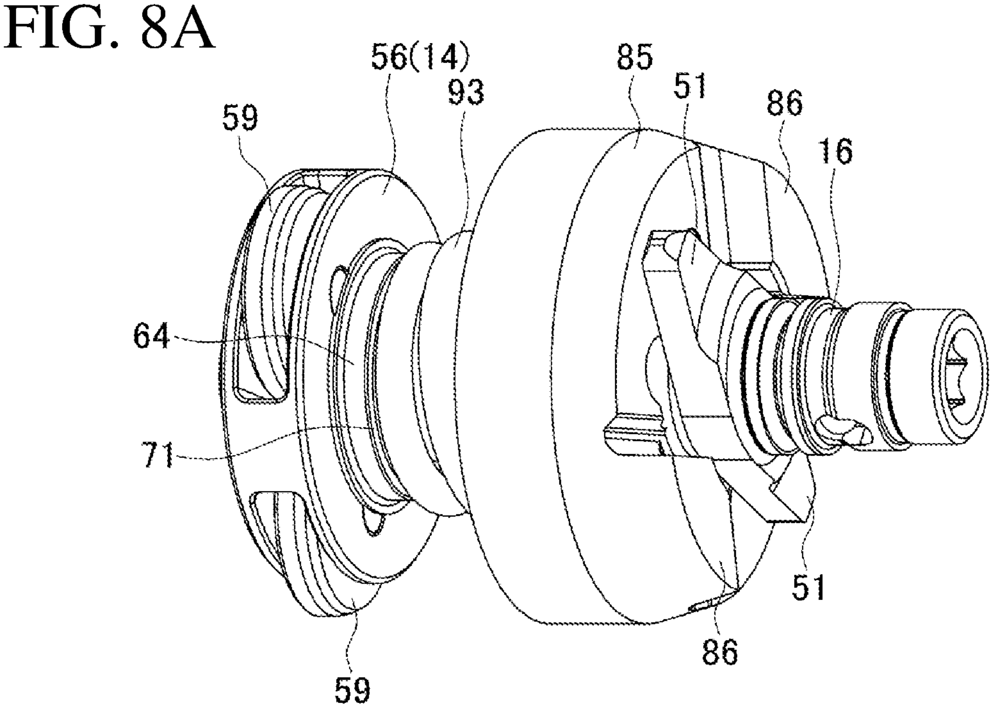
FIG. 8A is a perspective view of a striking assembly with a hammer at a forward position.
Figure 8B:
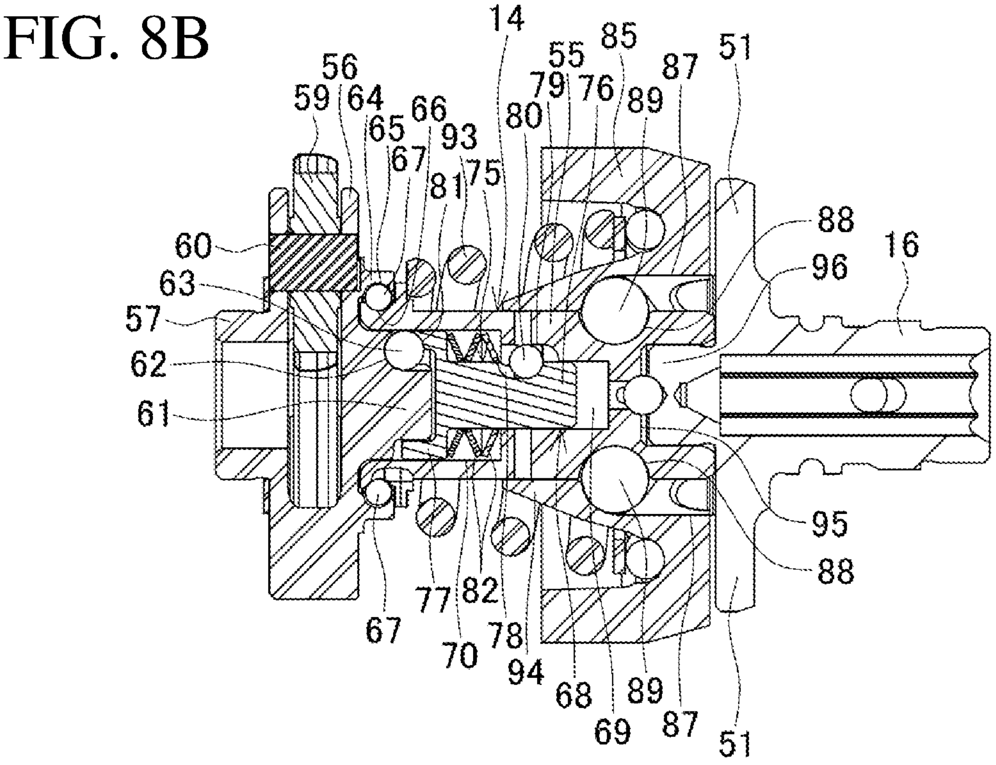
FIG. 8B is a longitudinal cross-sectional view of the striking assembly with the hammer at the forward position.

The hammer 85 is thus urged to a forward position shown in FIGS. 8A and 8B by the coil spring 93. At the forward position, the balls 89 are at the rear ends of the outer cam grooves 87 and the tips of the inner cam grooves 88.

The shaft 55 has a fitting recess 95 in the center of its front end. The anvil 16 includes a fitting protrusion 96 at the center of its rear surface. The fitting protrusion 96 is fitted in the fitting recess 95. The shaft 55 has an axial communication hole 97. The communication hole 97 allows the fitting recess 95 and the cam reception hole 68 to communicate with each other. A receiving ball 98 is fitted to the front end of the communication hole 97. The receiving ball 98 receives the rear end of the fitting protrusion 96.

The shaft 55 has a front grease supply hole 99 and a rear grease supply hole 100. The front grease supply hole 99 communicates with the communication hole 97 between the inner cam grooves 88 and is open in the outer circumferential surface of the shaft 55. The rear grease supply hole 100 communicates with the small diameter hole 69 in the cam reception hole 68 and one of the outer grooves 79, and is open in the outer circumferential surface of the shaft 55. The front grease supply hole 99 and the rear grease supply hole 100 are orthogonal to each other when viewed from the front.

In the impact driver 1 according to the present embodiment, the trigger 18 is pressed to turn on the switch 17 after a bit (not shown) is attached to the anvil 16. The brushless motor 12 is then powered to rotate the rotational shaft 31. More specifically, the microcomputer in the control circuit board 23 receives, from the rotation detectors in the sensor circuit board 30, rotation detection signals (rotation detection signals indicating the position of the sensor permanent magnet 34 in the rotor 26), and determines the rotational state of the rotor 26. The microcomputer then controls the on-off state of each switching element in accordance with the determined rotational state, and applies a current through the coils 29 in the stator 25 sequentially to rotate the rotor 26.

When the rotational shaft 31 rotates, the planetary gears 59, which mesh with the pinion 43, revolve in the internal gear 46. This causes the carrier 56 to rotate at a lower speed. The rotation of the cam projection 61 integral with the carrier 56 is transmitted to the cam 75 through the cam balls 63 in between rolling to the circumferential ends of the rear cam recesses 62, as indicated with the two-dot chain line in FIG. 6. The rotation of the cam 75 is transmitted to the shaft 55 through the coupling balls 80 in between. The hammer 85 then rotates together with the shaft 55 with the balls 89 in between, thus rotating the anvil 16 with the arms 51 engaged with the tabs 86. This allows tightening a screw with the bit.

When the screw is tightened and increases the torque of the anvil 16, the hammer 85 retracts against the urging force from the coil spring 93 while rolling the balls 89 along the corresponding inner cam grooves 88 on the shaft 55. After the tabs 86 are disengaged from the arms 51, the hammer 85 rotates forward along the inner cam grooves 88 under the urging force from the coil spring 93. This then causes the tabs 86 to be re-engaged with the arms 51, thus causing the anvil 16 to generate a rotational striking force (impact). This process is repeated for further tightening of the screw.

Figure 9A:
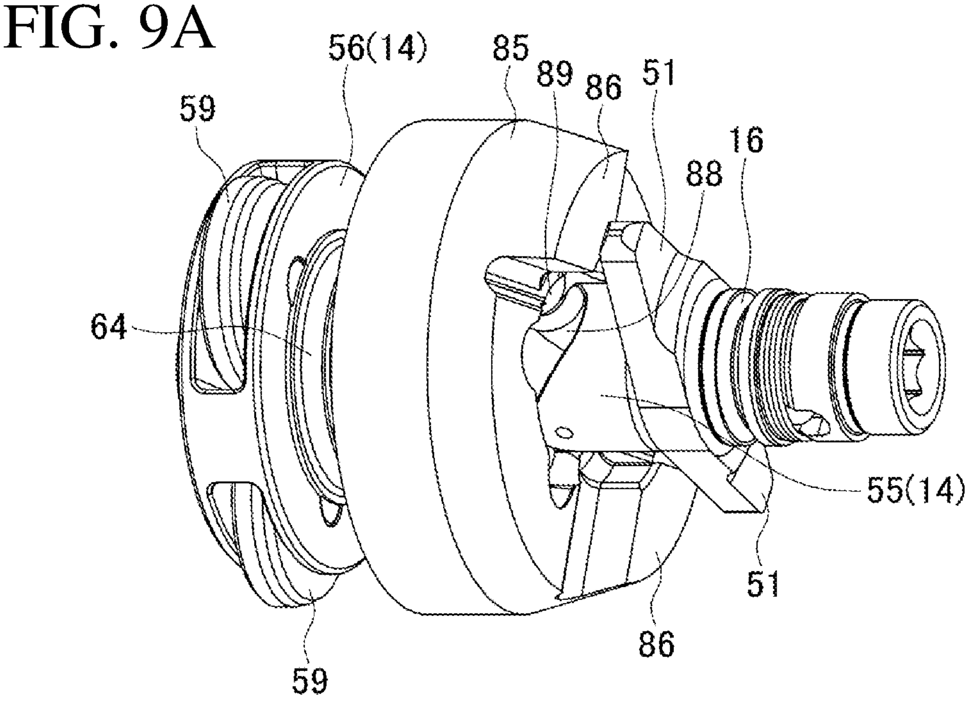
FIG. 9A is a perspective view of the striking assembly with the hammer at a rearmost position.
Figure 9B:
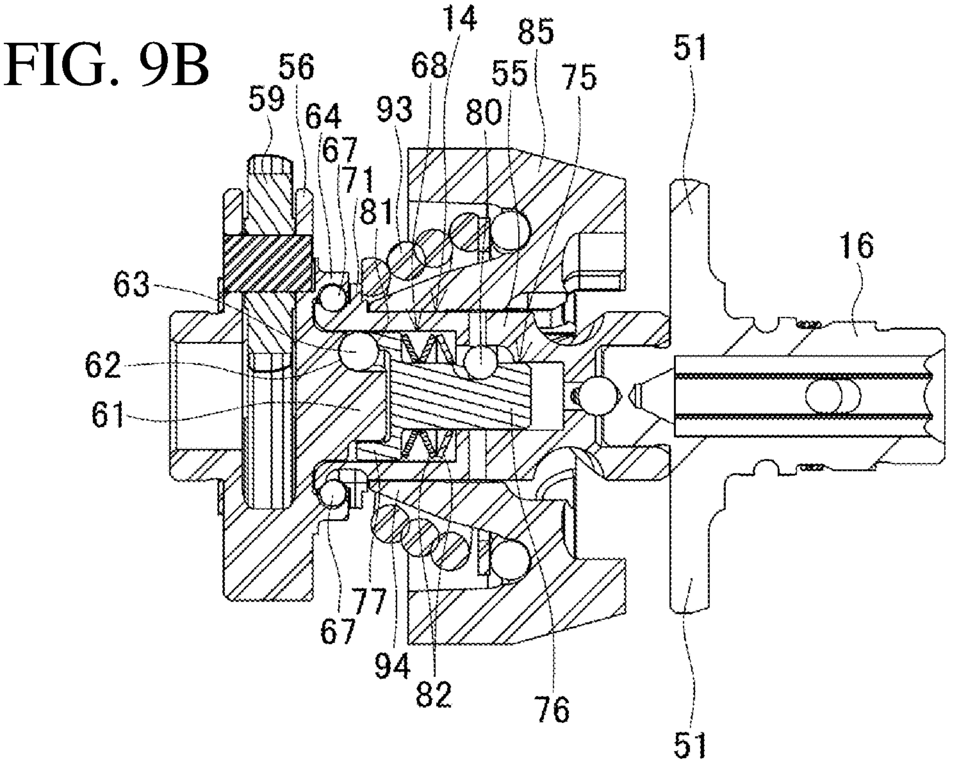
FIG. 9B is a longitudinal cross-sectional view of the striking assembly with the hammer at the rearmost position.

When the screw is tightened in a high load state, the balls 89 may roll to the rear ends of the inner cam grooves 88 along with the retracting hammer 85 as shown in FIGS. 9A and 9B. This state is referred to as the hammer 85 at a rearmost position. In this state, the rear end of the central cylindrical portion 94 in the hammer 85 is not in contact with the flange 71 on the shaft 55.

Figure 10A:
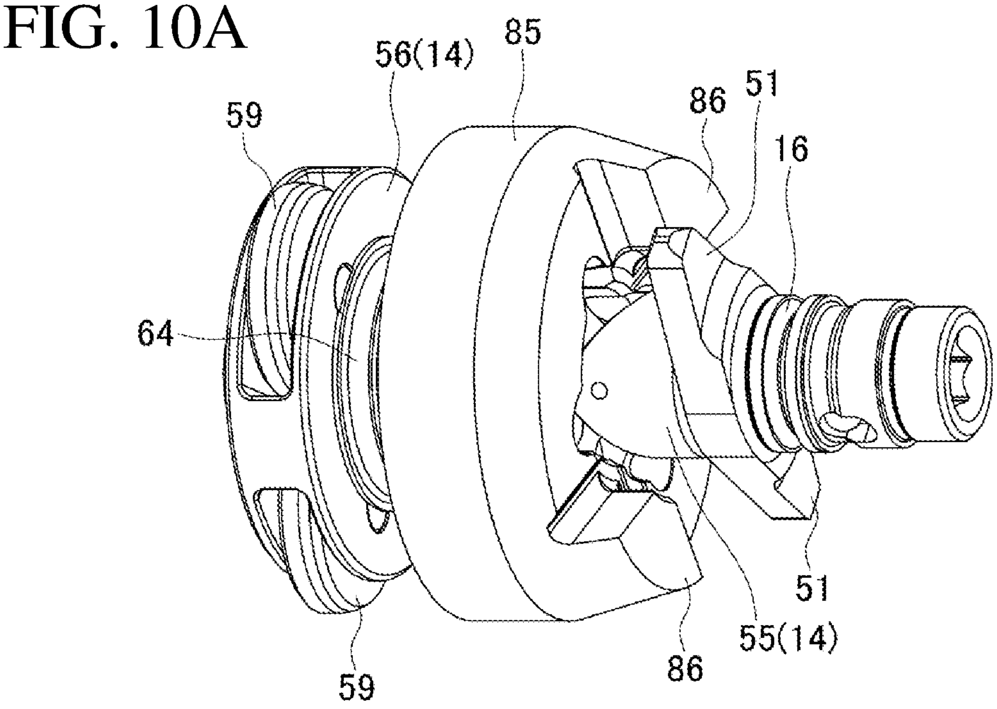
FIG. 10A is a perspective view of the striking assembly with a cam assembly in operation.
Figure 10B:
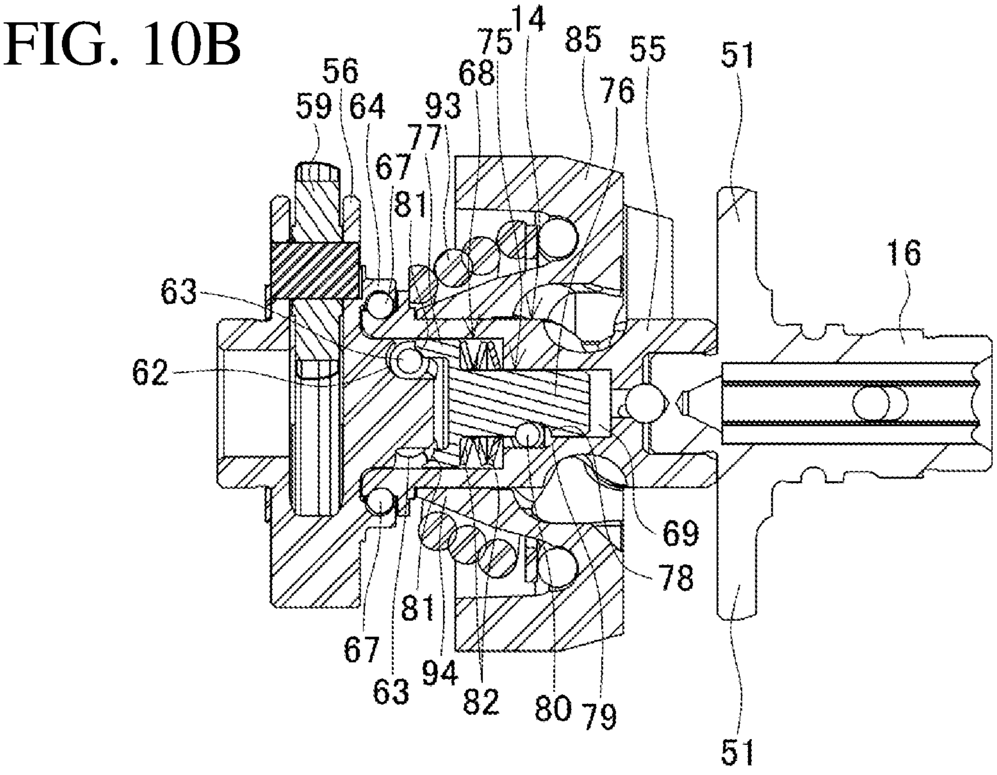
FIG. 10B is a longitudinal cross-sectional view of the striking assembly with the cam assembly in operation.

When the rotational energy does not decrease with the hammer 85 at the rearmost position, the hammer 85 and the shaft 55 are urged to rotate further. Thus, the rotational energy of the shaft 55 exceeds the engagement force between the cam 75 and the cam projection 61 caused by the disc springs 82. As shown in FIGS. 10A and 10B, the cam 75 integral with the shaft 55 in the rotation direction then rolls the cam balls 63 relatively to the circumferential ends of the front cam recesses 81, compresses and deforms the disc springs 82, and moves forward against the urging force from the disc springs 82 while rotating. The cam projection 61 and the shaft 55 may have a phase shift between them as the cam 75 moves forward and compresses and deforms the disc springs 82. This can decrease the rotational energy. Thus, when the hammer 85 retracts to the rearmost position, a shock load is not transmitted to the carrier 56.

When the hammer 85 at the rearmost position starts moving forward under the urging force from the coil spring 93, the cam 75 retracts under the urging force from the disc springs 82 to roll the cam balls 63 relatively to the circumferential centers of the front cam recesses 81. This eliminates the phase shift between the cam projection 61 and the shaft 55.

The impact driver 1 according to the present embodiment includes the brushless motor 12 (motor), the carrier 56 including the planetary gears 59 (reduction assembly) and rotatable by the brushless motor 12, and the shaft 55 to receive the rotation of the carrier 56 and rotatable relative to the carrier 56 in an overloaded state. The impact driver 1 further includes the hammer 85 held by the shaft 55 and the anvil 16 to be struck by the hammer 85 in the rotation direction.

This structure allows the carrier 56 and the shaft 55 to rotate relative to each other in an overloaded state, thus absorbing the rotational energy. This effectively reduces durability deterioration caused by a shock load. This also decreases the urging force from the coil spring 93, which urges the hammer 85. Thus, the first impact occurs earlier during further screwing. This reduces the likelihood of camming out (the tip of the bit separates and slips out of the screw head).

The shaft 55 extends frontward. The hammer 85 is held by the shaft 55 with the balls 89 in between. The balls 89 roll in the inner cam grooves 88 (cam grooves) on the outer circumferential surface of the shaft 55. This causes the hammer 85 to be movable back and forth between the forward position at which the hammer 85 is engaged with the anvil 16 in the rotation direction and a rearward position at which the hammer 85 is disengaged from the anvil 16 in the rotation direction. The hammer 85 is urged to the forward position by the coil spring 93 externally mounted on the shaft 55. The shaft 55 rotates relative to the carrier 56 in response to an overload occurring at the rearward position for the hammer 85 at which the balls 89 reach the rearmost ends of the inner cam grooves 88.

The structure of the spindle 14 dividable into the shaft 55 and the carrier 56 allows the relative rotation in an overloaded state.

A cam assembly (the cam projection 61, the cam 75, and the disc springs 82) is located between the carrier 56 and the shaft 55. The cam assembly transmits the rotation of the carrier 56 to the shaft 55 and rotates the carrier 56 and the shaft 55 relative to each other in the overloaded state of the shaft 55.

Thus, the carrier 56 and the shaft 55 are easily rotated relative to each other with the cam assembly.

The cam assembly includes the cam projection 61 protruding frontward from the center of the carrier 56, the cam 75 coupled to the shaft 55 in a manner rotatable together with the shaft 55 and movable back and forth relative to the shaft 55, and the disc springs 82 (urging members) to urge the cam 75 to a rearward position. The cam 75 is engageable with the cam projection 61 at the rearward position to transmit the rotation of the carrier 56 to the shaft 55, and rotates the carrier 56 and the shaft 55 relative to each other at the forward position.

This structure transforms a shock load from the hammer 85 at the rearmost position into deformation of the disc springs 82, thus effectively reducing the rotational energy.

The cam projection 61 and the cam 75 are engaged with each other with the cam balls 63 in between. The cam projection 61 and the cam 75 transmit the rotation of the carrier 56 to the shaft 55. Thus, the rotation of the carrier 56 is smoothly transmitted to the cam 75.

The cam projection 61 includes the rear cam recesses 62 holding the cam balls 63 on its outer circumferential surface. The cam 75 includes, on its rear end, the front cam recesses 81 engaged with the cam balls 63. This facilitates transmission of the rotation from the cam projection 61 to the cam 75 as well as deformation of the disc springs 82 as the cam 75 moves forward.

The structure includes the three cam balls 63, the three rear cam recesses 62, and the three front cam recesses 81. This allows transmission of the rotation from the cam projection 61 to the cam 75 as well as deformation of the disc springs 82 in a well-balanced manner as the cam 75 moves forward.

The cam 75 is coupled to the shaft 55 with the coupling balls 80 in a manner rotatable together with the shaft 55 and movable back and forth relative to the shaft 55. This reliably allows switching between transmission of the rotation from the cam 75 to the shaft 55 and relative rotation.

The shaft 55 is cylindrical and has the rear end with an opening. The cam 75 and the disc springs 82 are accommodated in the shaft 55. Thus, the cam assembly can be located in a small space using the shaft 55.

The shaft 55 internally has the cam reception hole 68 including a rear portion with a larger diameter than a front portion. The cam 75 is a shaft having a stepped-diameter including the front shaft 76 (smaller-diameter portion) placed in the front portion of the cam reception hole 68 and the expanded portions 77 (larger-diameter portions) placed in the rear portion of the cam reception hole 68.

The urging members include the multiple disc springs 82 externally mounted on the front shaft 76. Thus, the urging members can be included in a small space in the shaft 55.

The shaft 55 receives the cam projection 61 in its rear end and is coupled to the carrier 56 at its rear end in a rotatable manner. Thus, the shaft 55 and the carrier 56 can be integrated into the dividable spindle 14 in a space-saving manner.

The carrier 56 includes, on its front surface, the joint 64 that is annular and concentric with the cam projection 61. The shaft 55 is connected to the inner surface of the joint 64 at its rear end in a rotatable manner. Thus, the shaft 55 can be easily connected using the joint 64.

The joint 64 and the rear end of the shaft 55 are connected to each other with the multiple connecting balls 67 arranged in the circumferential direction of the joint 64 and the shaft 55. Thus, the shaft 55 and the carrier 56, which are rotatable relative to each other, can be reliably connected.

The shaft 55 includes the flange 71 receiving the rear end of the coil spring 93. This allows the coil spring 93 and the shaft 55 to rotate together.

Modifications will now be described.

In the embodiment, the carrier includes the cam projection and the cam includes the expanded portion covering the cam projection. In some embodiments, the cam may include the cam projection in its rear portion and the carrier may include the expanded portion covering the cam projection on its front surface. The structure may include more or fewer front cam recesses, rear cam recesses, and balls than in the illustrated example.

The number of disc springs to urge the cam may be changed as appropriate. The urging members may be, for example, coil springs other than disc springs.

The structure may include more or fewer inner grooves, outer grooves, and balls to couple the shaft and the cam than in the illustrated example. The shaft and the cam may be key-coupled or splined, without using the balls.

The reduction assembly may include more or fewer planetary gears than in the illustrated example.

The motor is not limited to a brushless motor. The power source is not limited to a battery pack but may be utility power.

The present disclosure is also applicable to impact tools other than an impact drive, such as an angle impact driver.

REFERENCE SIGNS LIST

1 impact driver
2 body
3 grip
4 body housing
6 hammer case
12 brushless motor
13 reduction assembly
14 spindle
15 striking assembly
16 anvil
22 controller
31 rotational shaft
43 pinion
55 shaft
56 carrier
59 planetary gear
61 cam projection
62 rear cam recess
63 cam ball
64 joint
67 connecting ball
68 cam reception hole
71 flange
75 cam
76 front shaft
77 expanded portion
81 front cam recess
82 disc spring
85 hammer
89 ball
93 coil spring

What is claimed is:

1. An impact tool, comprising:
a stator;
a rotor rotatable relative to the stator;
a pinion configured to be rotated by the rotor;
a planetary gear configured to mesh with the pinion;
a carrier configured to (i) hold the planetary gear and (ii) be rotated by the planetary gear;
a shaft (i) selectively rotatable relative to the carrier and (ii) having a cam groove in an external surface of the shaft;
a first ball in the cam groove;
a hammer (i) engageable with the first ball and (ii) rotatable in a rotation direction due to engagement with the first ball; and
an anvil configured to be struck by the hammer in the rotation direction,
wherein the shaft and the carrier are configured such that (i) the shaft rotates at a same speed as the carrier when the hammer is located at a frontward position and (ii) the shaft rotates at a different speed than the carrier when the hammer is located at a rearward position.

2. The impact tool according to claim 1, wherein:
the carrier includes a projection extending in an axial direction of the carrier and the shaft; and
the shaft is mounted on the projection.

3. The impact tool according to claim 2, further comprising:
a second ball configured to switch the carrier and the shaft between a rotatable state in which the carrier and the shaft rotate together and an unrotatable state in which the shaft does not rotate with the carrier.

4. The impact tool according to claim 2, wherein
the shaft, the carrier and the hammer are configured such that the shaft rotates relative to the carrier when the hammer is in the rearward position in a direction opposite to an axial direction.

5. The impact tool according to claim 2, wherein
the shaft is a separate member from the carrier.

6. The impact tool according to claim 1, wherein
the shaft, the carrier and the hammer are configured such that the shaft rotates relative to the carrier when the hammer is in the rearward position in a direction opposite to an axial direction.

7. The impact tool according to claim 6, wherein
the shaft is a separate member from the carrier.

8. The impact tool according to claim 1, further comprising:
an internal gear that is attached to a housing of the impact tool such that the internal gear cannot rotate relative to the housing;
wherein the planetary gear is configured to engage the internal gear to cause rotation of the carrier.

9. The impact tool according to claim 1, further comprising a second ball operatively between the carrier and the shaft, wherein:
the carrier has a projection that protrudes in an axial direction of the carrier and the shaft; and
the projection, the second ball and the shaft are configured such that the second ball rotationally connects the projection and the shaft while permitting limited axial movement between the projection and the shaft.

10. The impact tool according to claim 1, wherein the cam groove has a V-shape when viewed from a direction perpendicular to an axis of the shaft.

11. The impact tool according to claim 1, wherein the hammer is mounted on the shaft.

12. The impact tool according to claim 11, wherein the hammer has an internal groove that corresponds to the cam groove.

13. An impact tool, comprising:

a stator;

a rotor rotatable relative to the stator;

a pinion configured to be rotated by the rotor;

a planetary gear configured to mesh with the pinion;

a carrier configured to (i) hold the planetary gear and (ii) be rotated by the planetary gear;

a shaft (i) selectively rotatable relative to the carrier by the carrier and (ii) having a cam groove in an external surface of the shaft;

a first ball in the cam groove;

a hammer (i) engageable with the first ball and (ii) rotatable in a rotation direction due to engagement with the first ball;

an anvil configured to be struck by the hammer in the rotation direction; and a second ball configured to switch the carrier and the shaft between a rotatable state in which the carrier and the shaft rotate together and an unrotatable state in which the shaft does not rotate with the carrier.

14. The impact tool according to claim 13, wherein the shaft, the carrier and the hammer are configured such that the shaft rotates relative to the carrier when the hammer is in a rearward position in a direction opposite to an axial direction.

15. The impact tool according to claim 13, wherein the shaft is a separate member from the carrier.

* * * * *